US006313823B1

(12) United States Patent
Cappels et al.

(10) Patent No.: US 6,313,823 B1
(45) Date of Patent: Nov. 6, 2001

(54) SYSTEM AND METHOD FOR MEASURING THE COLOR OUTPUT OF A COMPUTER MONITOR

(75) Inventors: Richard Cappels, San Jose; Jesse Devine, Sunnyvale, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/009,042

(22) Filed: Jan. 20, 1998

(51) Int. Cl.$^7$ .............................. G09G 5/02; G06T 11/40
(52) U.S. Cl. ............................................ 345/150; 345/431
(58) Field of Search ..................................... 345/150, 431

(56) References Cited

U.S. PATENT DOCUMENTS

| | | | | |
|---|---|---|---|---|
| Re. 33,973 | * | 6/1992 | Kriz et al. | 358/244 |
| 4,709,267 | | 11/1987 | Sendelweck . | |
| 4,733,229 | | 3/1988 | Whitehead . | |
| 4,876,663 | | 10/1989 | McCord . | |
| 4,907,174 | | 3/1990 | Priem . | |
| 5,150,107 | | 9/1992 | Kurisu . | |
| 5,204,748 | | 4/1993 | Lagoni . | |
| 5,313,291 | * | 5/1994 | Appel et al. | 358/501 |
| 5,386,247 | | 1/1995 | Shafer et al. . | |
| 5,394,067 | | 2/1995 | Santelmann, Jr. . | |
| 5,396,151 | | 3/1995 | Cappels, Sr. . | |
| 5,469,540 | | 11/1995 | Powers, III et al. . | |
| 5,473,371 | | 12/1995 | Choi . | |
| 5,493,317 | | 2/1996 | Kim . | |
| 5,497,436 | | 3/1996 | Miller . | |
| 5,512,961 | * | 4/1996 | Cappels, Sr. | 348/658 |
| 5,550,443 | | 8/1996 | Lee . | |
| 5,550,556 | | 8/1996 | Wu et al. . | |
| 5,555,026 | | 9/1996 | Lee . | |
| 5,561,459 | * | 10/1996 | Stokes et al. | 348/180 |
| 5,564,002 | | 10/1996 | Brown . | |
| 5,570,108 | | 10/1996 | McLaughlin et al. . | |
| 5,574,507 | | 11/1996 | Baek . | |
| 5,579,029 | | 11/1996 | Arai et al. . | |
| 5,588,098 | | 12/1996 | Chen et al. . | |
| 5,606,348 | | 2/1997 | Chiu . | |

(List continued on next page.)

FOREIGN PATENT DOCUMENTS

| | | |
|---|---|---|
| 0856829 | 8/1998 | (EP) . |
| WO96/17338 | 6/1996 | (WO) . |
| WO98/32277 | 7/1998 | (WO) . |
| WO00/17842 | 3/2000 | (WO) . |

OTHER PUBLICATIONS

U.S. application No. 08/900,964, Richard D. Cappels, Sr., System and Method for Generating High–Luminance Windows on a Computer Display Device, filed Jul. 25, 1997.

U.S. application No. 09/076,664, Christoph H. Krah, System and Method for Dynamic Correction of Display Characteristics, filed May 12, 1998.

U.S. application No. 09/160,503, Richard D. Cappels, Sr., Apparatus and Method for Handling Special Windows in a Display, filed Sep. 24, 1998.

U.S. application No. 09/705,140, Richard D. Cappels, Sr., System and Method for Generating High–Luminance Windows on a Computer Display Device, filed Nov. 1, 2000.

*Primary Examiner*—Jeffery Brier
*Assistant Examiner*—Anthony J. Blackman
(74) *Attorney, Agent, or Firm*—Carr & Ferrell, LLC

(57) ABSTRACT

A system measures the color output of a computer monitor by using predetermined phosphor characteristics of the monitor that are stored in monitor memory. The relationship between beam current and pixel values is then determined and stored in computer memory. When a color output measurement is taken, the average pixel values are determined. The beam currents associated with the average pixel values are then accessed from the computer memory and multiplied by the phosphor characteristics to obtain an accurate color output measurement.

36 Claims, 8 Drawing Sheets

U.S. PATENT DOCUMENTS

| | | | | |
|---|---|---|---|---|
| 5,638,117 | * | 6/1997 | Engledrum et al. | 348/179 |
| 5,675,391 | | 10/1997 | Yamaguchi et al. . | |
| 5,694,227 | | 12/1997 | Starkweather . | |
| 5,706,035 | | 1/1998 | Tsunoda et al. . | |
| 5,724,519 | | 3/1998 | Kato et al. . | |
| 5,726,672 | | 3/1998 | Hernandez et al. . | |
| 5,731,843 | | 3/1998 | Cappels, Sr. . | |
| 5,742,354 | | 4/1998 | Vlahos et al. . | |
| 5,745,097 | | 4/1998 | Cappels . | |
| 5,786,803 | | 7/1998 | Hernandez et al. . | |
| 5,821,917 | * | 10/1999 | Cappels | 345/150 |
| 5,889,500 | | 3/1999 | Chuang et al. . | |
| 5,903,267 | | 5/1999 | Fisher . | |
| 5,917,488 | | 6/1999 | Anderson et al. . | |
| 5,926,174 | | 7/1999 | Shibamiya et al. . | |
| 5,959,691 | | 9/1999 | Koh . | |
| 5,966,124 | | 10/1999 | Devine . | |
| 5,977,946 | | 11/1999 | Mizobata . | |
| 5,978,745 | * | 11/1999 | Devine | 702/107 |
| 5,990,858 | | 11/1999 | Ozolins . | |
| 6,026,409 | | 2/2000 | Blumenthal . | |

* cited by examiner

SYSTEM AND METHOD FOR MEASURING THE COLOR OUTPUT OF A COMPUTER MONITOR

BACKGROUND OF THE INVENTION

1. Field of the Invention

This invention relates generally to computer display monitors and relates more particularly to a system and method for accurately measuring the color output of a computer monitor.

2. Description of the Background Art

Accurate measurement of color displays is a significant consideration for manufacturers, designers, and users of computer devices. When computer users send images to a printer device, it becomes important to accurately specify individual colors so that the resulting printed material exactly matches the colors shown on the computer monitor screen. Further, when image data from one display monitor is displayed on a different monitor, the image data may be displayed with different colors because of the type of computer monitor, the video display circuitry, and various other related factors.

Conventionally, to obtain a measurement of the color output of a computer monitor, a system user has to select a sufficiently large area on the computer monitor screen, or enlarge a smaller area of the computer monitor screen, and then position a photometer device to sense the selected area of the monitor screen. This method is both time-consuming and cumbersome. An easier and faster, but potentially less accurate method uses a software routine to determine the color output of the computer monitor. After the user selects an area of the computer monitor screen for measurement, the software routine uses a lookup table to estimate what the color output should be, based on monitor parameters (for example model or type) entered by the system user.

While this software method is slightly more convenient when compared to the previous method (because a separate external device like a photometer is not required), it is still relatively inconvenient to the system user because it requires the system user to correctly enter the relevant monitor parameters. Further, this method may be inaccurate because it depends on a predetermined estimate of color output, based on the computer monitor parameters.

Additionally, without correct color output measurements, printer devices may have difficulty printing accurate colors based solely on a picture from a computer. Intermediate proofs may be required to verify the accuracy of the colors, and special inks may have to be formulated manually. These procedures are both likely time-consuming and expensive. Therefore, for all the foregoing reasons, an improved system and method are needed to measure the color output of a computer monitor, in accordance with the present invention.

SUMMARY OF THE INVENTION

In accordance with the present invention, a system and method are disclosed for accurately measuring the color output of a computer monitor. This invention accurately measures the color output by using factory-calibrated phosphor characteristics (phosphor characteristics determine the amount of displayed color per ampere of beam current), and then developing a correlation between beam current in the monitor and pixel values. The invention is composed of a system and method that establishes the relationship between beam current and pixel values; accesses the factory-calibrated phosphor characteristics; determines the beam current in the display based on the pixel values of an area of the computer screen selected by the system user; and multiplies the beam current by the phosphor characteristics to yield an accurate measurement of the color output. An additional function of the system and method is to yield an accurate Pantone Color simulation of the color output by searching a database of PANTONE colors.

In the preferred embodiment of the present invention, a calibration routine first creates a lookup table. In practice, the system first calibrates the monitor so that a pixel value of zero results in a beam current of zero. Second, the system then generates a flat white field on the monitor display and then measures the red, green and blue pixel values and the associated red, green, and blue beam currents. Third, the system then generates a gray field on the computer monitor screen and again measures the red, green, and blue pixel values and the associated beam currents. Creating a graph with pixel values on the x axs and beam current on the y axis, two data points can be plotted for each color (one point measured when the flat white field was generated, and one point measured when the gray field was generated). From these two data points (beam current plotted against pixel value) for each color, exponential curves may be created to provide a beam current corresponding to each pixel value. Separate exponential curves are generated for each color to yield red beam current measurements for red pixels; green beam current measurements for green pixels; and blue beam current measurements for blue pixels. These beam current and pixel values are then stored into a lookup table for future reference.

In the next step, the user selects an area of the computer monitor screen to be analyzed. To select the area, the user first places the cursor over a selected pixel on the computer monitor. This then becomes the origin pixel. The user next selects an aperture size. The aperture size is a measure of the area surrounding (and including) the origin pixel. In the preferred embodiment, the aperture size ranges from one pixel, in which case only the origin pixel will be measured, to thirteen-by-thirteen pixels. The system next separately averages the red, green, and blue pixel values in the user-specified aperture area. Each pixel value has a red, green, and blue component. So, for example, the average red pixel value consists of the sum of the red components of each pixel in the selected area divided by the total number of pixels in the selected area. This averaging procedure is repeated for the green and blue pixel values.

The system next determines the beam current associated with the average red, green, and blue pixel values, by referring to the predetermined lookup table. The system then fetches the phosphor characteristics internally stored in the monitor's memory and multiplies the phosphor characteristics by the beam current previously determined for each color. The results are then converted into a user-specified format and displayed. Formats supported preferably include RGB, CIE 1931, CIE 1976, CIE L*a*b*, and Thstimulus color spaces.

In addition, the above results may then be matched to a PANTONE Color. In the preferred embodiment, the present invention performs a search through a PANTONE Color database to determine the closest matches. The three closest matches are preferably then displayed on the computer monitor. PANTONE Colors are useful because they are a reference standard. They allow the user to specify the specific color to be used in a printer device, and by having an accurate PANTONE Color, the correct color can be specified directly to the printer device. Therefore, there is no need for preparing intermediate proofs, or for manually formulating ink. Accordingly, the present invention more accurately and efficiently measures the color output of a computer display.

DETAILED DESCRIPTION OF THE PREFERRED EMBODIMENT

The present invention relates to an improvement in measuring the color output of a computer display. The following description is presented to enable one of ordinary skill in the art to make and use the invention, and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The invention measures color output of a computer monitor by using predetermined phosphor characteristics of the monitor. The phosphor characteristics (amount of displayed color per ampere of beam current) are stored in monitor memory. The relationship between beam current and pixel values is then determined and stored in computer memory. When a color output measurement is taken, the average pixel values of a selected display area are determined. The beam currents associated with the average pixel values are then accessed from the computer memory and multiplied by the phosphor characteristics to obtain an accurate color output measurement. Further, a database of PANTONE Colors may be searched, and the closest matches may then be displayed.

Figure 1:
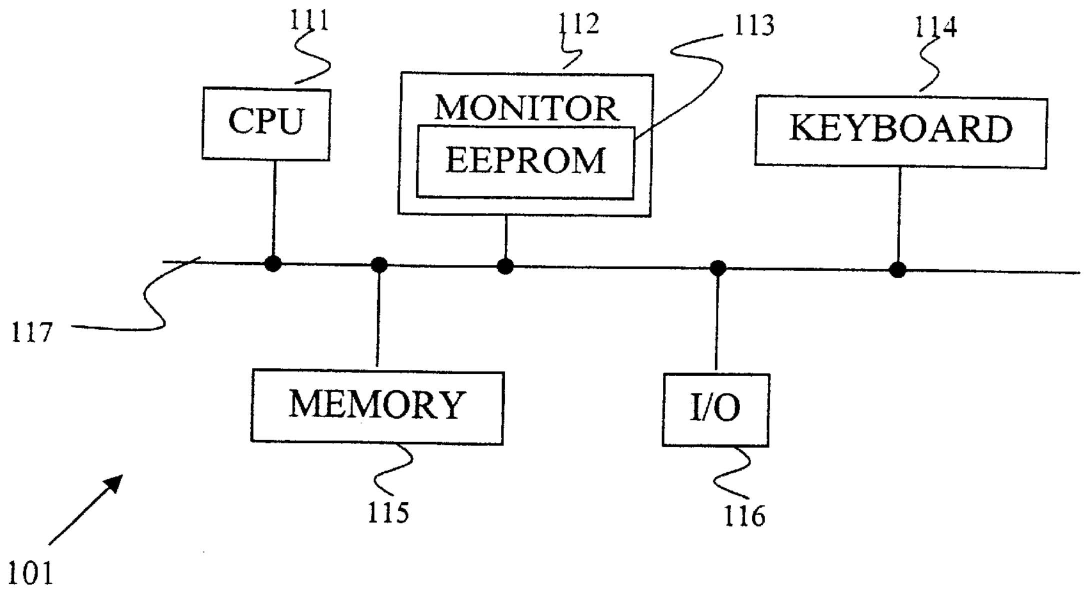
FIG. 1 is a block diagram of one embodiment for a computer system, in accordance with the present invention.

Referring now to FIG. 1, a block diagram of a computer system 101 is shown, according to the present invention. In the preferred embodiment, the computer system 101 preferably includes a Central Processing Unit (CPU) 111, a monitor 112, a keyboard 114, memory 115, and an input and output interface (I/O) 116. CPU 111, monitor 112, keyboard 114, memory 115, and input and output interface 116 are all connected by system bus 117, as shown in FIG. 1. The monitor 112 also contains Electrically-Erasable Programmable Read-Only Memory (EEPROM) 113. Memory 115 may comprise a hard disk drive, random access memory (RAM) or any other compatible and appropriate memory configuration.

Figure 2:
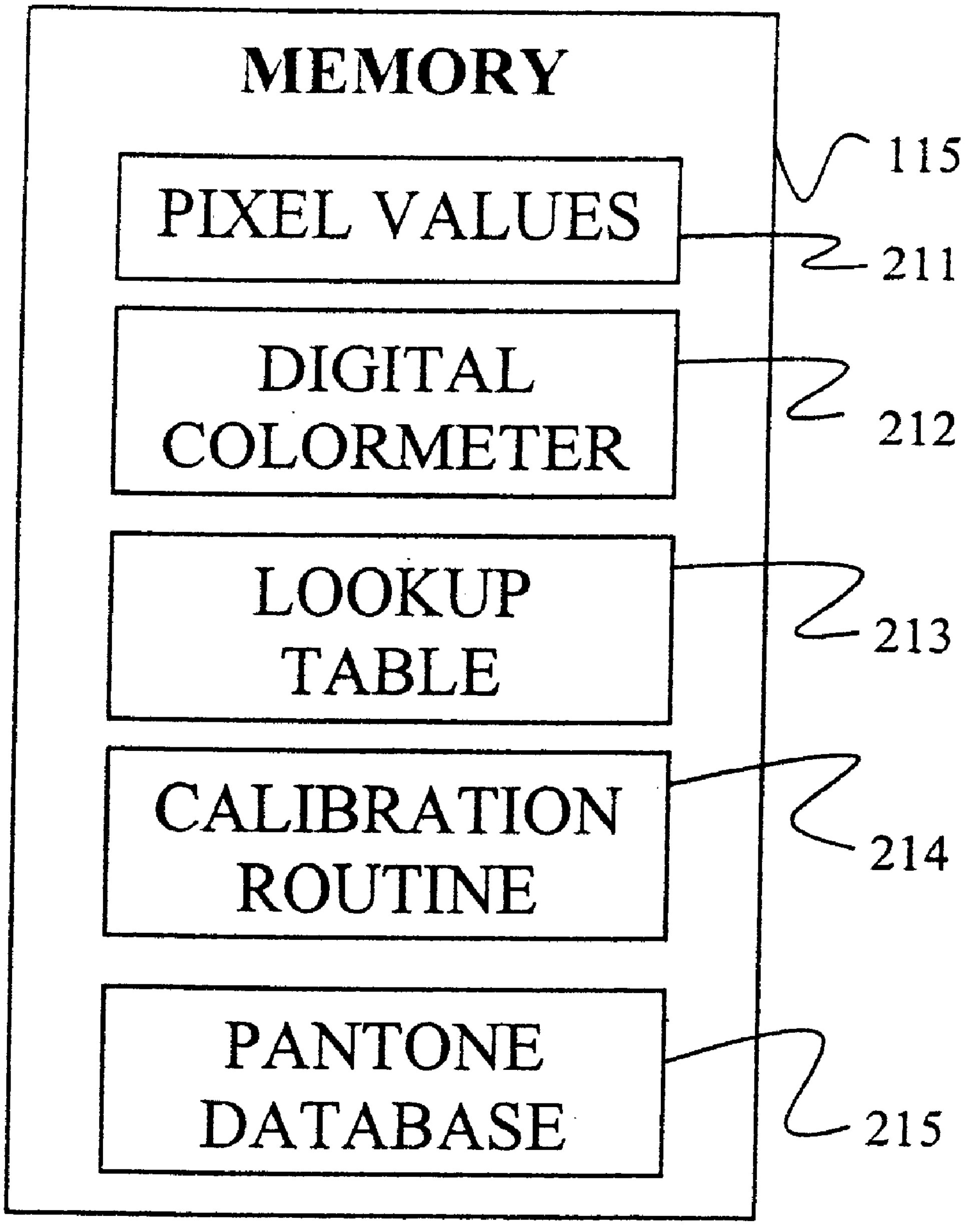
FIG. 2 is a block diagram of one embodiment of the memory shown in FIG. 1.

Referring now to FIG. 2, a drawing of a preferred embodiment for memory 115 is shown. The memory 115 preferably includes values for the pixels ("pixel values") 211 that are currently displayed on the monitor 112. Also located in the memory 115 is the digital colormeter software 212 which performs the color output measurement, in accordance with the present invention; a lookup table 213 which contains a list of pixel values and the corresponding beam currents required to produce those pixel values; a calibration routine 214 which creates the lookup table 213; and a PANTONE Color database 215 which. contains the specifications of all colors in the PANTONE Color library. The operation and functionality of the digital colormeter software 212 is further discussed below in conjunction with FIG. 7. Calibration routine 214 is further discussed below in conjunction with FIG. 5.

Figure 3:
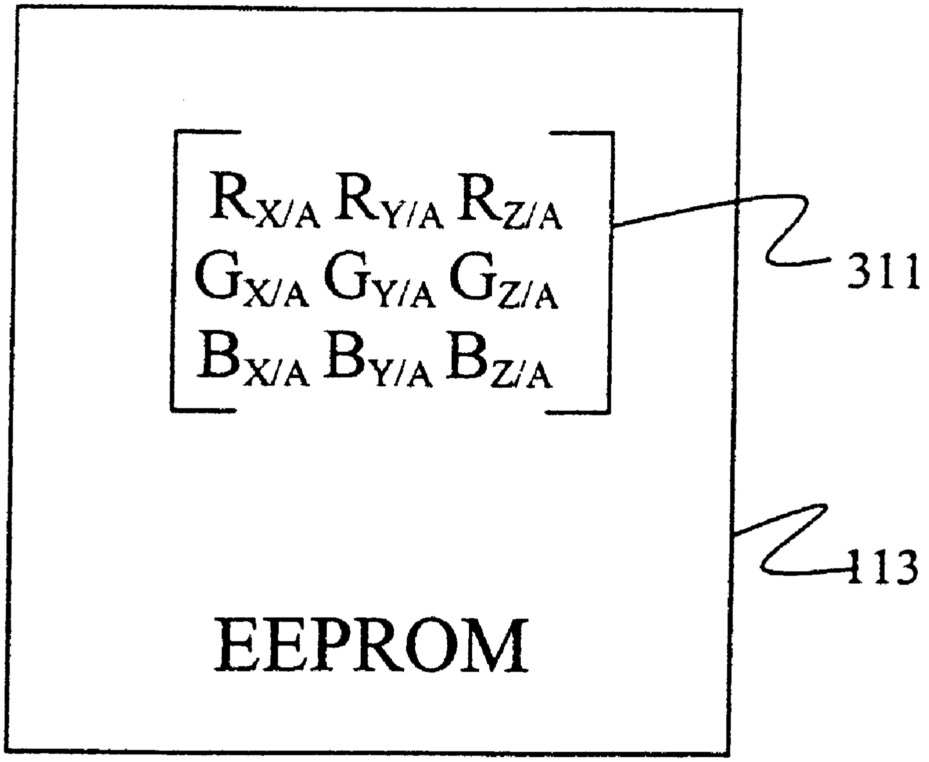
FIG. 3 is a block diagram showing one embodiment for the Electrically-Erasable Programmable Read-Only Memory (EEPROM) located in the monitor of FIG. 1.

Referring now to FIG. 3, a drawing of one embodiment for the EEPROM 113 is shown. The EEPROM 113 preferably includes an array 311 of nine values that represent the specific phosphor characteristics of the monitor 112. In practice, the internal face of a computer display screen is typically coated with phosphors and an electron beam is then deflected across this phosphor-coated internal face. The electron beam thus strikes the phosphor-coated internal face and causes the phosphor to produce colored light. In the preferred embodiment, these phosphor characteristics are determined during manufacture of the monitor 112, and the phosphor characteristics are then stored into the EEPROM 113. The foregoing phosphor characteristics are preferably a measure of the amount of displayed color output from monitor 112 per ampere of beam current.

The color output of monitor 112 is determined according to the CIE color model developed by the Commission Internationale de l'Eclairage (International Commission on Illumination) committee. The CIE model is based on human visual perception and regarded as an accurate means of measuring color. In the preferred embodiment, the array 311 contains the values of CIE X, Y, and Z per ampere of beam current for the respective colors red, green and blue. So, $R_{X/A}$ is the amount Red CIE X per ampere; $R_{Y/A}$ is the amount of Red CIE Y per ampere; and $R_{Z/A}$ is the amount of Red CIE Z per ampere. $G_{X/A}$ is the amount of Green CIE X per ampere; $G_{Y/A}$ is the amount of Green CIE Y per ampere; and $G_{Z/A}$ is the amount of Green CIE Z per ampere. $B_{X/A}$ is the amount of Blue CIE X per ampere; $B_{Y/A}$ is the amount of Blue CIE Y per ampere; and $B_{Z/A}$ is the amount of Blue CIE Z per ampere.

Figure 4:
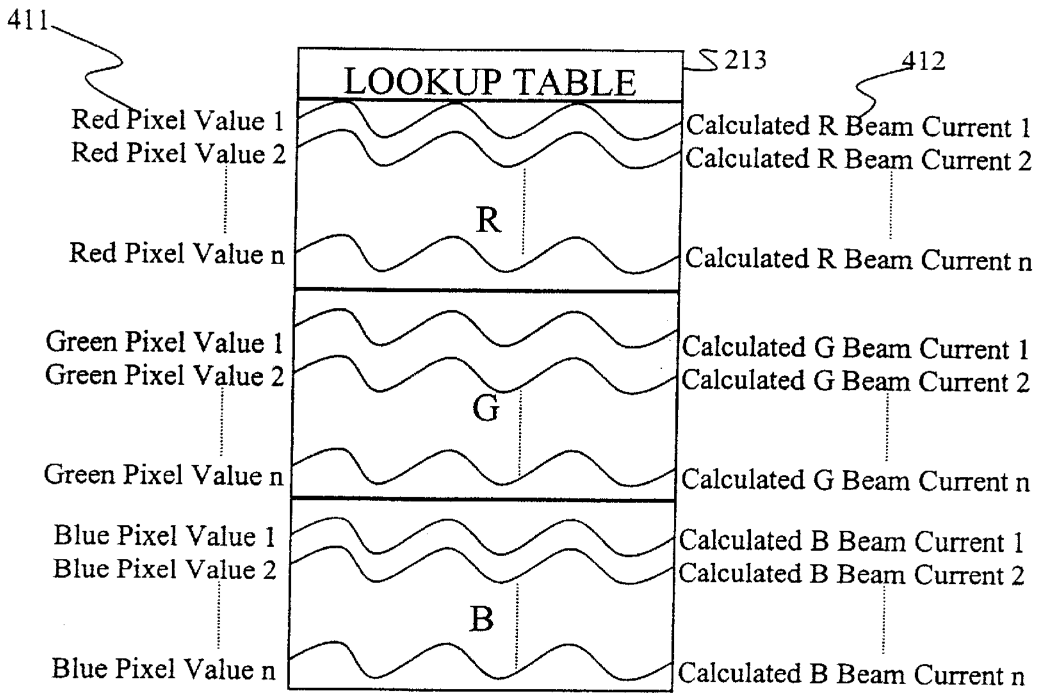
FIG. 4 is a block diagram of one embodiment for the lookup table shown in FIG. 2.

Referring now to FIG. 4, a drawing of one embodiment for the lookup table 213 is shown. Each pixel value of monitor 112 has a red, green, and blue component. The lookup table 213 preferably contains a list of all the red, green and blue components of pixel values and the corresponding beam currents required to generate those component pixel values. For example, calculated R beam current 1 (412) is required to produce red pixel value 1 (411). This lookup table 213 is created by calibration routine 214 detailed below in conjunction with FIG. 5.

Figure 5:
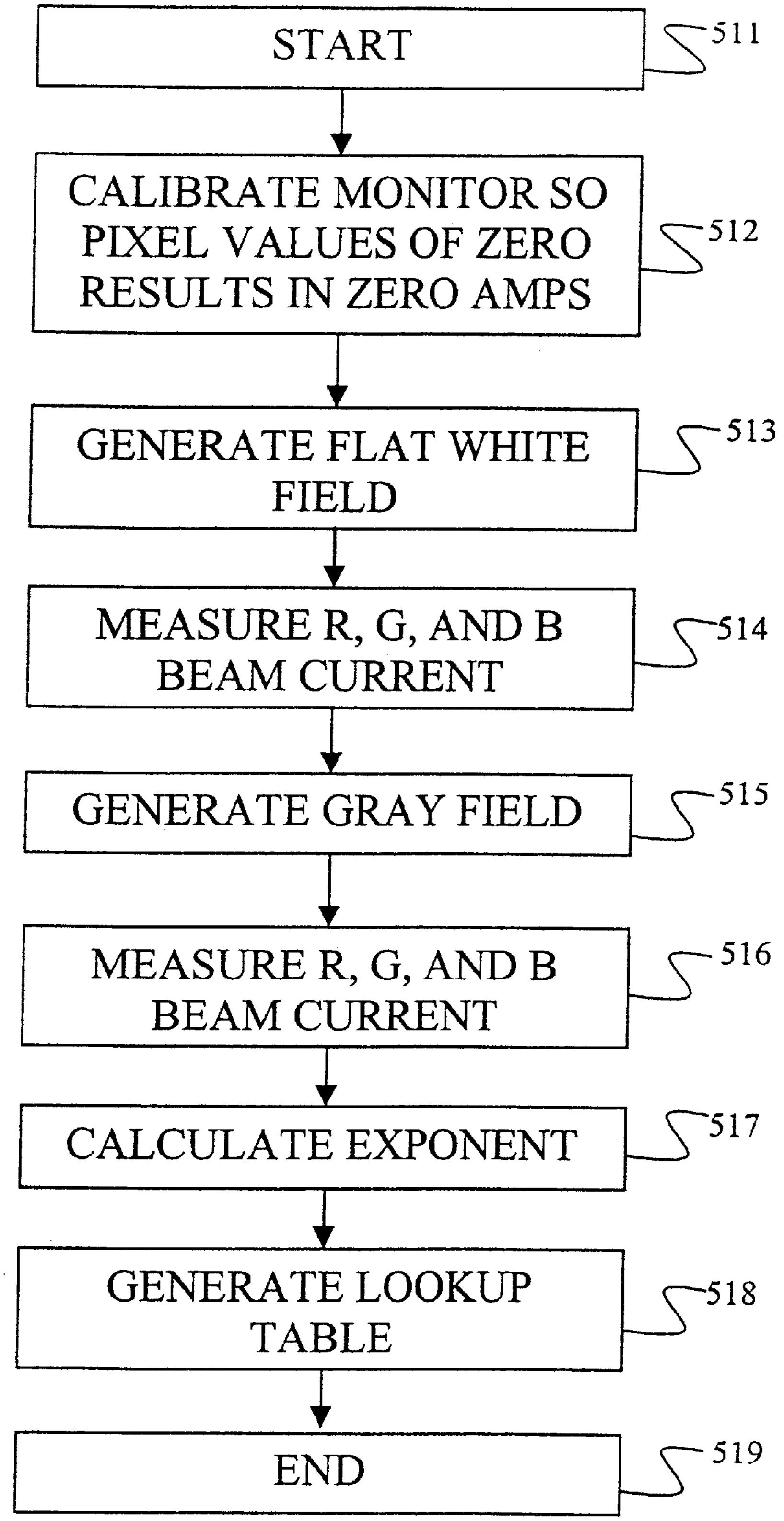
FIG. 5 is a flowchart of preferred method steps for creating the lookup table of FIG. 4.

Referring now to FIG. 5, a flowchart of preferred method steps for creating a lookup table 213 is shown, in accordance with the present invention. In step 512, calibration routine 214 calibrates the monitor 112 so that pixel values of zero for individual colors red, green, and blue yield red, green, and blue beam currents of zero amperes in the computer monitor 112. In step 513, calibration routine 214 generates a flat white field on the monitor 112. In step 514, calibration routine 214 then measures the individual red, green, and blue pixel values and their associated red, green and blue beam currents.

Next, in step 515, calibration routine 214 generates a gray field on the monitor 112. In step 516, calibration routine 214 again measures the red, green, and blue pixel values and their associated red, green, and blue beam currents in computer monitor 112. Creating a graph with pixel values on the x axis and beam current on the y axis, two data points (one corresponding to the foregoing white field and one corresponding for the gray field) can be plotted for each color using the pixel values and beam currents measured in steps 514 and 516. From the foregoing two data points for each color (beam currents plotted against pixel values), an exponent is calculated in step 517, as discussed below in conjunction with FIG. 6. In step 518, the calibration routine 214 generates the lookup table 213. The lookup table 213 is generated by calculating the expected beam current for each and every pixel value based on the exponential curve 613 in FIG. 6 calculated for each color in step 517. This is done individually for red, green, and blue colors. Therefore, the lookup table will contain a list of red, green and blue beam currents for all possible red, green and blue pixel values. While the FIG. 5 method is used in the preferred embodiment, other methods for generating the lookup table 213 are equally feasible. For instance, instead of using only two data points (beam currents plotted against pixel values) per color to generate an exponent, any number of data points, up to and including all data points, could be used to further increase the accuracy of the lookup table, albeit at the sacrifice of process speed.

Figure 6:
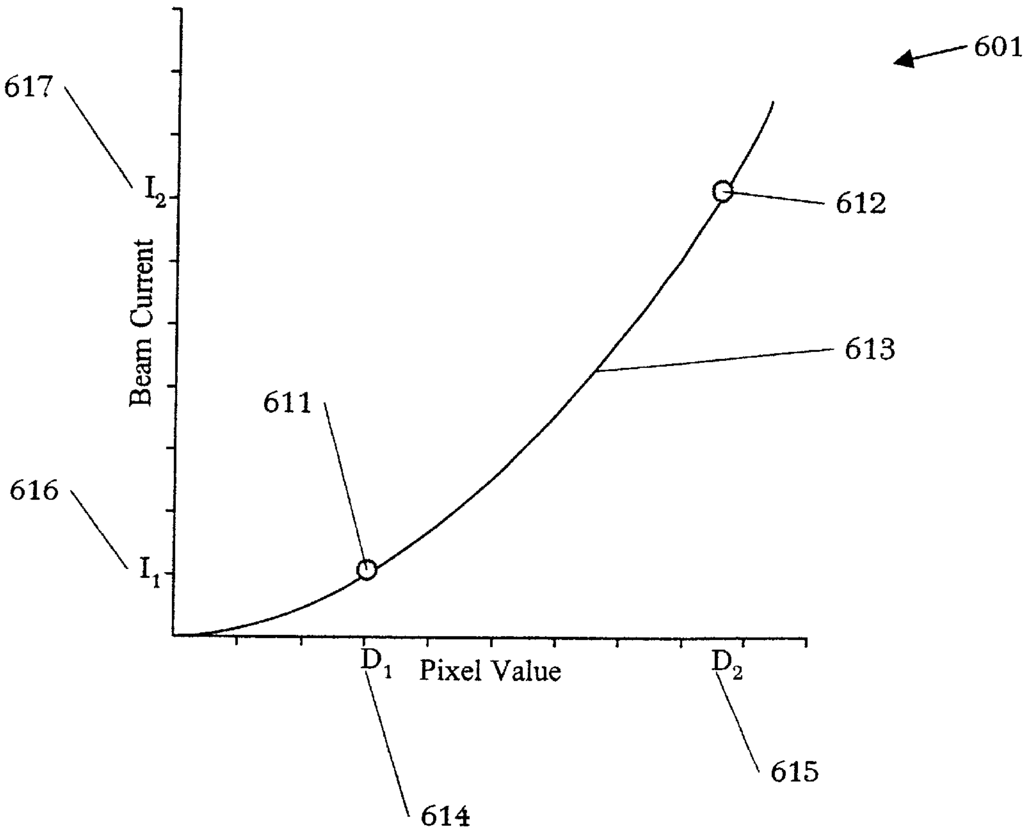
FIG. 6 is a graph showing an exponential relationship between beam currents and pixel values, according to the present invention.

Referring now to FIG. 6, graph 601 shows an exponential curve 613 with the pixel values, displayed on the x axis and beam currents displayed on the y axis, according to the current invention. Two data points 611 and 612 are shown located on exponential curve 613. These two data points 611 and 612 were measured in foregoing steps 514 and 516 of FIG. 5 above. D1 and D2 (614 and 615, respectively) represent the pixel values for one color (for example, red) as measured in foregoing steps 514 and 516. $I_1$ and $I_2$ (616 and 617, respectively) represent the corresponding beam currents measured when pixel values D1 and D2 (614 and 615) were displayed in steps 514 and 516. In the preferred embodiment, an exponent is then calculated by calibration routine 214 (in step 517 of FIG. 5) as the log of $(I_1/I_2)$ divided by the log of $((D_1/D_2)$, since beam current is equal to pixel value raised to this exponent as shown by curve 611 of graph 601. Calibration routine 214 then preferably repeats step 517 of FIG. 5 to calculate an exponent for the remaining colors (for example green and blue).

Figure 7:
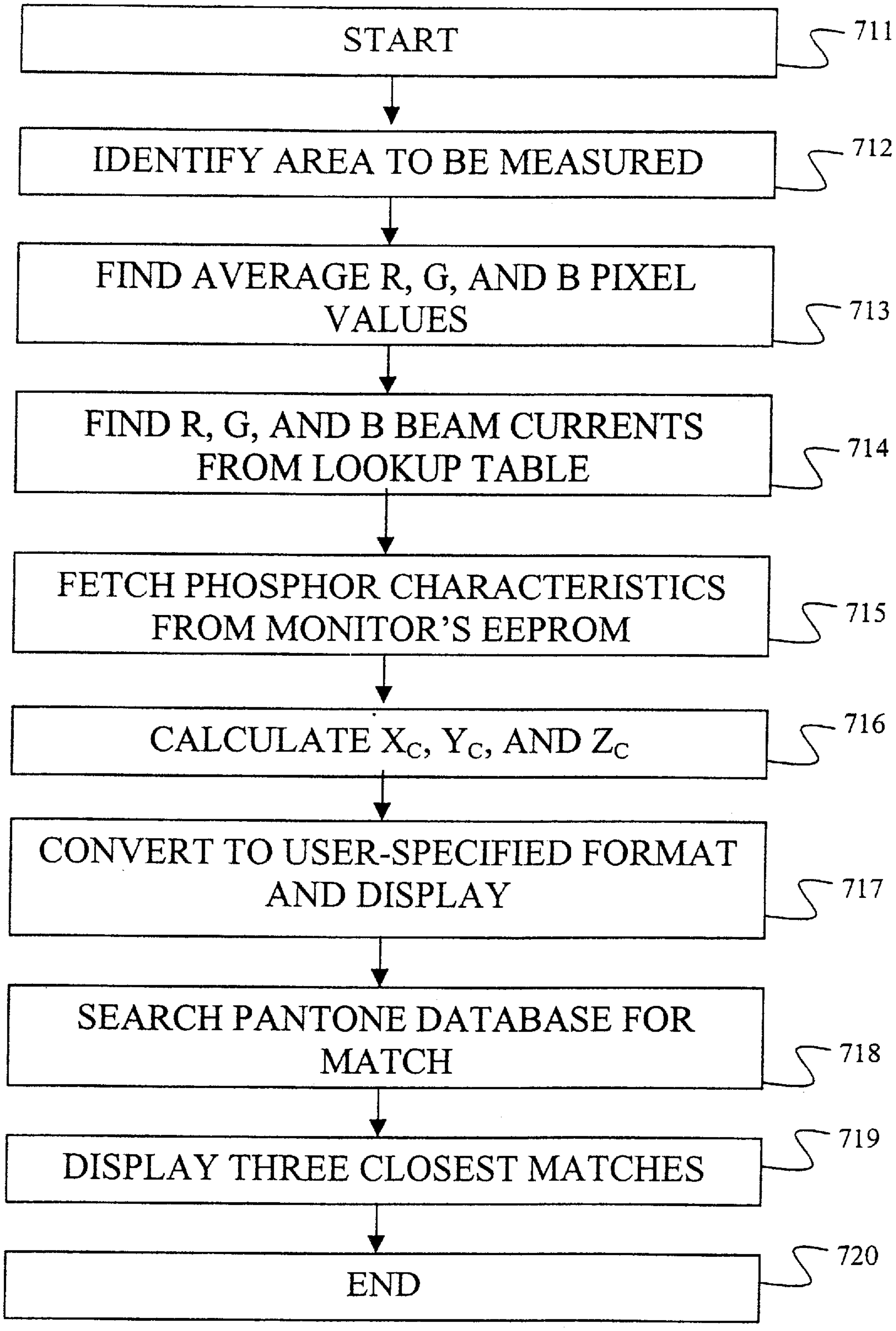
FIG. 7 is a flowchart of preferred method steps for measuring the color output of a computer monitor, according to the present invention.

Referring now to FIG. 7, a flowchart of preferred method steps for measuring the color output of a computer monitor 112 is shown. In step 712, the system user identifies the area of the monitor 112 to be measured. In the preferred embodiment, the system user typically uses a mouse or other input device to place a cursor over a selected pixel on the screen of computer monitor 112, as shown below in FIG. 8. Next, the system user selects an aperture size to determine a measurement area around the selected cursor.

In the preferred embodiment, the aperture size can vary from one pixel, in which case only the origin pixel (the pixel on which the cursor is centered) will be measured, to an area that is thirteen-by-thirteen pixels (six pixels to the left, right, top and bottom of the origin pixel). The aperture size preferably increases in odd increments so that the origin pixel remains centered, otherwise the aperture window would have to shift in order to avoid averaging fractional pixels. While the preferred embodiment of the invention currently limits the aperture window to thirteen-by-thirteen pixels, other embodiments may readily allow larger aperture windows.

In step 713, the digital colormeter software 212 separately averages the red, green, and blue pixel values for the red, green, and blue colors displayed in the area selected on monitor 112 during foregoing step 712. Each pixel value has a red, green and blue component. To find the average pixel value for each color, the digital colormeter software 212 first separates and then totals the individual red, green, and blue components of each pixel value 211 from the area identified by the user in step 712.

The digital colormeter software 212 then divides each of the red, green and blue component totals by the number of pixels in the area identified in step 712 thereby yielding average red, green, and blue pixel values. In step 714, the digital colormeter software 212 accesses the lookup table 213 to find the red, green, and blue beam currents associated with the average red, green, and blue pixel values calculated in step 713. In step 715, the digital colormeter software 212 fetches the phosphor characteristics 311 from the EEPROM 1 13 located in monitor 112.

In step 716, the digital colormeter software 212 calculates values for $X_c$, $Y_c$, and $Z_c$. These values, $X_C$, $Y_C$, and $Z_C$, are in a Tristimulus color space format. $X_C$ is equal to the total of Blue X, Red X, and Green X. Blue X is equal to $B_{X/A}$, from the Array 311 in EEPROM 113, multiplied by the blue beam current determined during step 714. Red X is equal to $R_{X/A}$, from the Array 311 in EEPROM 113, multiplied by the red beam current determined in step 714. Green X is equal to $G_{X/A}$, from the Array 311 in EEPROM 113, multiplied by the green beam current determined in step 714.

Similarly, $Y_C$ is equal to the total of Blue Y, Red Y, and Green Y. Blue Y is equal to $B_{Y/A}$, from the Array 311 in EEPROM 113, multiplied by the blue beam current determined in step 714. Red Y is equal to $R_{Y/A}$, from the Array 311 in EEPROM 113, multiplied by the red beam current determined in step 714. Green Y is equal to $G_{Y/A}$, from the Array 311 in EEPROM 113, multiplied by the green beam current determined in step 714.

Further, $Z_C$ is equal to the total of Blue Z, Red Z, and Green Z. Blue Z is equal to $B_{Z/A}$, from the Array 311 in EEPROM 113, multiplied by the blue beam current determined in step 714. Red Z is equal to $R_{Z/A}$, from the Array 311 in EEPROM 113, multiplied by the red beam current determined in step 714. Green Z is equal to $G_{Z/A}$, from the Array 311 in EEPROM 113, multiplied by the green beam current determined in step 714.

In an alternative embodiment of above-mentioned steps 713 through 716 of FIG. 7, the digital colormeter software 212 first individually converts each pixel in the user-specified area of monitor 112 into its separate $X_C$, $Y_C$, and $Z_C$ components using steps 714 through 716 of FIG. 7. The digital colormeter software 212 next separately averages the $X_C$, $Y_C$, and $Z_C$ components of each pixel in the user-specified area. So, for example, the average $X_C$ value in the user-specified area is equal to the sum of all the $X_C$ components of the pixels in the user-specified area divided by the number of pixels in the user-specified area. This averaging procedure is repeated for the $Y_C$ and $Z_C$ components of the pixels in the user-specified area of monitor 112. The digital colormeter software 212 then continues with step 717 as described below. While this alternative embodiment yields slightly more accurate results, it requires more computational power than the preferred embodiment, therefore causing the digital colormeter software 212 to execute slower.

In step 717, the digital colormeter software 212 either displays the Tristimulus values $X_C$, $Y_C$, and $Z_C$ calculated in step 716 on the computer monitor 112, or converts the Tristimulus values $X_C$, $Y_C$, and $Z_C$ to another color space format using well known equations and then displays the converted color space values on monitor 112. Color space formats supported include RGB (the original format of the pixel values 211 as stored in memory 115); CIE 1931; CIE 1976; CIE L*a*b*; and Tristimulus values. While the preferred embodiment only displays color measurements in these formats, other formats are equally envisioned for use by this invention.

In step 718, digital colormeter software 212 searches the PANTONE Color Database 215 in Memory 115. While the preferred embodiment contains only a PANITNE Color Database, other embodiments may readily include databases for other color reference standards, such as TruMatch™. Values in the PANTONE Color Database 215 are matched to the Tristimulus values determined in step 716. The three closest matches are then displayed on the monitor 112.

Figure 8:
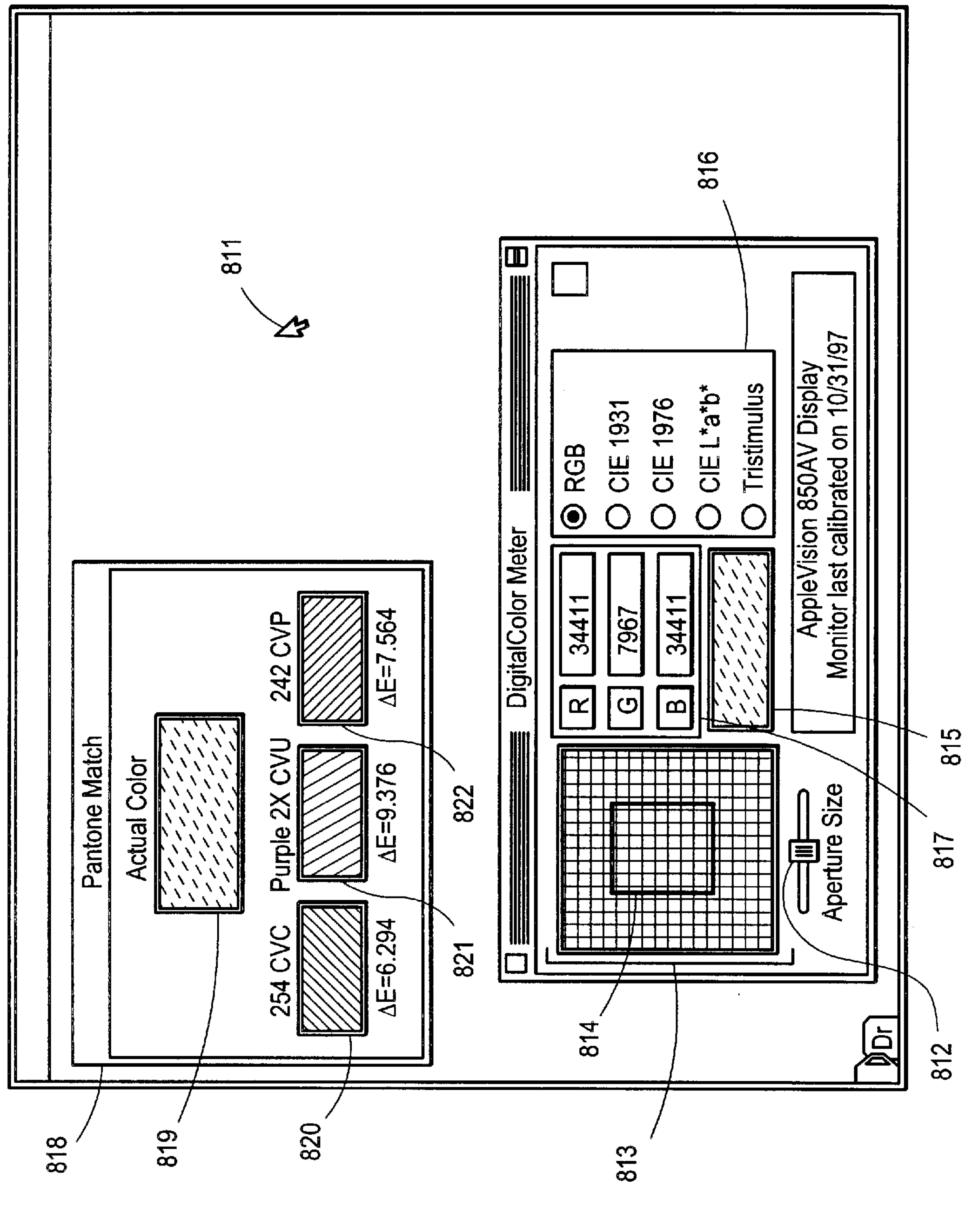
FIG. 8 is a drawing of the preferred embodiment of a monitor screen, according to the present invention.

Referring now to FIG. 8, a drawing of the preferred embodiment of a monitor screen 801 is shown, according to the present invention. To identify an area of the monitor screen 801 to be measured, the system user preferably positions cursor 811 to identify the origin pixel as described above in conjunction with step 712 of FIG. 7. Aperture window 813 shows an enhanced view of the origin pixel and the identified area surrounding the origin pixel.

Next, the system user moves aperture size control 812 to the left or right to systematically decrease or increase the identified area around (and including) the origin pixel indicated by cursor 811. Changes in the size of the identified area are indicated graphically by a size increase or decrease of select box 814 in aperture window 813. As aperture size control 812 is moved to the right by the system user to increase the identified area, select box 814 increases in area around the origin pixel. As aperture size control 812 is moved to the left by the system user to decrease the size of the identified area, select box 814 decreases in size. Window 815 shows the averaged color output of the identified area, as determined in step 713 of FIG. 7.

To change the format of the color output measurement, the system user preferably selects one of buttons 816. The color output measurements in the format specified by one of the selected buttons 816 are then displayed in windows 817. Pantone Color simulation results from step 718 of FIG. 7 are displayed in dialog box 818. Dialog box 818 preferably includes the four windows 819, 820, 821 and 822. Window 819 displays the averaged color as determined in step 713 of FIG. 7. Window 819 thus shows the same color as displayed in window 815. Windows 820, 821, and 822 display the three closest Pantone Color simulations, as determined in step 718 of FIG. 7. Immediately above windows 820, 821 and 822, the names of the respective colors, according to the PANTONE Color database 215, are displayed. Immediately below windows 820, 821, and 822, a value for each respective color is displayed. These values located below windows 820, 821, and 822 are a measure of the accuracy of the Pantone Color simulation performed in step 718 of FIG. 7.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. For instance, the color output of a television or various other display devices could be similarly measured by the present invention. Therefore, these and other variations upon the preferred embodiments are intended to be covered by the present invention, which is limited only by the appended claims.

What is claimed is:

1. A method for measuring color output of a monitor, comprising the steps of:

determining monitor phosphor characteristics corresponding to said monitor;

generating a lookup table containing a beam current entry for every pixel value entry, identifying a measurement area smaller than a display area on said monitor;

separately averaging said red, green, and blue pixel values in said measurement area;

determining beam currents associated with red, green, and blue pixel values displayed in said measurement area;

calculating color values for said measurement area by using said monitor phosphor characteristics; and converting said color values into a user-specified format and displaying said user-specified format.

2. A method for measuring color output of a monitor, comprising the steps of:

determining monitor phosphor characteristics corresponding to said monitor;

generating a lookup table containing at least one pixel value entry and a beam current entry for every pixel value entry, including at least the steps of calibrating said monitor so that a pixel value of zero results in a beam current measurement of zero amperes, measuring a beam current for said every pixel value entry, and storing said every pixel value entry and said beam current entry in said lookup table;

identifying a measurement area on said monitor;

separately averaging red, green, and blue pixel values in said measurement area;

determining beam currents associated with red, green, and blue pixel values displayed in said measurement area;

calculating color values for said measurement area by using said monitor phosphor characteristics; and converting said color values into a user-specified format and displaying said user-specified format.

3. A method for measuring color output of a monitor, comprising the steps of:

determining monitor phosphor characteristics corresponding to said monitor, generating a lookup table containing a beam current entry for every pixel value entry, including at least the steps of calibrating said monitor so that a pixel value of zero results in a beam current measurement of zero amperes, generating a flat white field on said monitor, measuring a first set of red, green and blue pixel values, measuring a first set of beam currents associated with said first set of red, green, and blue pixel values, generating a gray field on said monitor, measuring a second set of red, green and blue pixel values, measuring a second set of beam currents associated with said second set of red, green, and blue pixel values, determining a relationship between pixel values and beam currents using said first and second sets of beam currents and said first and second sets of red, green, and blue pixel values, and generating said lookup table for red, green, and blue pixel values based on said relationships;

identifying a measurement area on said monitor;

separately averaging red, green, and blue pixel values in said measurement area;

determining beam currents associated with red, green, and blue pixel values displayed in said measurement area; calculating color values for said measurement area by using said monitor phosphor characteristics; and converting said color values into a user-specified format and displaying said user-specified format.

4. The method of claim 1, wherein said step of averaging further comprises the steps of:

converting each red, green and blue pixel value in said measurement area into a tristimulus format; and averaging said converted red, green, and blue pixel values.

5. A system for measuring color output of a monitor, comprising:

a memory device, coupled to said monitor, including pixel values and a digital colormeter module; and a processor coupled to said memory device for measuring said color output of said monitor based on said pixel values by executing said digital colormeter module wherein said digital colormeter module determines an average pixel value of a measurement area that is a smaller than a display area on said monitor.

6. The system of claim 5, wherein said monitor further comprises an Electrically-Erasable Programmable Read-Only Memory, said Electrically-Erasable Programmable Read-Only Memory comprising an array of phosphor characteristics of said monitor.

7. The system of claim 6, wherein said memory device includes a color database and said digital colormeter module further includes instructions for matching said color output to said color database.

8. The system of claim 6, wherein said digital colormeter module further includes instructions for converting said color output into a user-specified format and displaying said user-specified format.

9. A computer-readable medium storing instructions for causing a computer to perform the steps of:

identifying a measurement area that is smaller than a display area of a monitor, determining average red, green and blue pixel values of said measurement area of said monitor;

determining beam currents associated with said average red, green and blue pixel values;

loading phosphor characteristics of said monitor into computer memory; and calculating color output of said measurement area by using said phosphor characteristics of said computer monitor and said beam currents associated with said average red, green, and blue pixel values.

10. A computer-readable medium storing instructions for causing a computer to perform the steps of:

identifying a measurement area of a monitor;

determining average red, green and blue pixel values of said measurement area;

determining beam currents associated with said average red, green and blue pixel values;

loading phosphor characteristics of said monitor into computer memory; and calculating color output of said measurement area by using said phosphor characteristics monitor and said beam currents; and searching a color database to match said color output and displaying a set of three closest matches.

11. The computer-readable medium of claim 9, further causing said computer to perform the step of generating a lookup table containing a beam current entity for every pixel value entry.

12. A computer-readable medium storing instructions for causing a computer to perform the steps of:

identifying a measurement area of a monitor;

determining average red, green and blue pixel values of said measurement area of said monitor;

determining beam currents associated with said average red, green and blue pixel values;

loading phosphor characteristics of said monitor into computer memory;

calculating color output of said measurement area by using said phosphor characteristics and said beam currents; and generating a lookup table containing a beam current entry for every pixel value entry, by calibrating said computer monitor so that a pixel value of zero results in a beam current measurement of zero amperes;

measuring red, green, and blue beam currents for each of said red, green, and blue pixel values; and storing said red, green, and blue pixel values and beam current values in said lookup table.

13. A computer-readable medium storing instructions for causing a computer to perform the steps of:

identifying a measurement area of a monitor;

determining average red, green and blue pixel values of said measurement area of said monitor;

determining beam currents associated with said average red, green and blue pixel values;

loading phosphor characteristics of said monitor into computer memory;

calculating color output of said measurement area by using said phosphor characteristics and said beam currents; and generating a lookup table containing a beam current entry for every pixel value entry by at least the steps of calibrating said monitor so that a pixel value of zero results in a beam current measurement of zero amperes;

generating a flat white field on said monitor;

measuring a first set of red, green and blue pixel values;

measuring a first set of beam currents associated with said first set of red, green, and blue pixel values;

generating a gray field on said monitor;

measuring a second set of red, green and blue pixel values;

measuring a second set of beam currents associated with said second set of red, green, and blue pixel values;

determining a relationship between pixel values and beam currents using said first and second sets of beam currents and said first and second sets of red, green, and blue pixel values; and generating said lookup table for red, green, and blue pixel values based on said relationship.

14. A computer-readable medium storing instructions for causing a computer to perform the steps of:

identifying a measurement area that is smaller than a display area of a monitor;

determining average red, green and blue pixel values of said measurement area of said monitor;

determining beam currants associated with red, green and blue pixel values in said measurement area;

loading an array of phospbor characteristics of said computer monitor into computer memory; and calculating color output of said red, green, and blue pixel values in said measurement area by using said phosphor characteristics of said computer monitor and said beam currents associated with said red, green, and blue pixel values.

15. A method for measuring color output of a monitor, comprising the steps of:

determining monitor phosphor characteristics corresponding to said monitor;

generating a lookup table containing a beam current entry for every pixel value entry;

identifying a measurement area on said monitor;

separately averaging a red, green, and blue pixel values in said measurement area;

determining beam currents associated with red, green, and blue pixel values displayed in said measurement area;

calculating color values for said measurement area by using said monitor phosphor characteristics;

converting said color values into a user-specified format and displaying said user-specified format; and searching a color database to match a color output and displaying a set of three closest matches.

16. The computer readable memory of claim 1 wherein the loading step loads phosphor characteristics from monitor memory.

17. The method of claim 1 further comprising the step of retrieving phosphor characteristics stored on a computer readable memory during a prior calibration.

18. The method of claim 1 further comprising the step of retrieving phosphor characteristics stored on a read only computer readable memory.

19. The method of claim 1 further comprising the step of retrieving phosphor characteristics from monitor memory and storing the phosphor characteristics in computer memory.

20. A system for measuring color output of a monitor, comprising:

a memory device, coupled to said monitor, including pixel values and a digital colormeter module and a calibration routine for creating a lookup table containing pixel values and corresponding beam currents required to produce said pixel values; and a processor coupled to said memory device for measuring said color output based on said pixel values by executing said calibration routine and said digital colormeter module;

wherein said memory includes instructions that direct the processor to search a database to match a color output and display a set of three matches that are closest.

21. A system for measuring color output of a monitor, comprising:

a memory device, coupled to said monitor, including pixel values and a digital colormeter module and a calibration routine for creating a lookup table containing pixel values and corresponding beam currents required to produce said pixel values; and a processor coupled to said memory device for measuring said color output based on said pixel values by executing said calibration routine and said digital colormeter module;

wherein said memory includes instructions for directing the processor to determine a relationship between pixel values and beam currents using first and second sets of beam currents and first and second sets of red, green and blue pixel values.

22. A system for measuring color output of a monitor, comprising:

a memory device, coupled to said monitor, including pixel values and a digital colormeter module and a calibration routine for creating a lookup table containing pixel values and corresponding beam currents required to produce said pixel values; and a processor coupled to said memory device for measuring said color output based on said pixel values by executing said calibration routine and said digital colormeter module;

wherein a monitor calibration related to a pixel value of zero results in a beam current of zero.

23. The system of claim 5 further comprising phosphor characteristics stored on a computer readable memory.

24. The system of claim 5 further comprising phosphor characteristics stored on a read only computer readable memory.

25. The system of claim 5 further comprising phosphor characteristics stored on monitor memory.

26. A computer-readable medium storing instructions for causing a computer to perform the steps of:

determining average red, green and blue pixel values of a measurement area identified by a user that is smaller than a display area of a monitor;

determining beam currents associated with said average red, green and blue pixel values;

loading phosphor characteristics of said monitor into memory; and calculating color output of said measurement area by using said phosphor characteristics of said monitor and said beam currents associated with said average red, green, and blue pixel values.

27. A computer-readable medium for storing instructions for causing a computer to perform the steps of:

determining average red, green and blue pixel values of a measurement area of a monitor identified by a user;

determining beam currents associated with said average red, green and blue pixel values;

loading phosphor characteristics of said monitor into computer memory;

calculating color output of said measurement area by using said phosphor characteristics of said monitor and said beam currents associated with said average red, green, and blue pixel values; and searching a color database to match said color output and displaying a set of three closest matches.

28. The computer-readable medium of claim 27, further storing instructions for causing said computer to perform the step of generating a lookup table containing a beam current entry for every pixel value entry.

29. A computer-readable medium for storing instructions for causing a computer to perform the steps of:

determining average red, green and blue pixel values of a measurement area of a monitor identified by a user;

determining beam currents associated with said average red, green and blue pixel values;

loading phosphor characteristics of said monitor into computer memory;

calculating color output of said measurement area by using said phosphor characteristics of said monitor and said beam currents associated with said average red, green, and blue pixel values; and generating a lookup table containing at least one pixel value entry and a beam current entry for every pixel value entry, including at least the steps of calibrating said monitor so that a pixel value of zero results in a beam current measurement of zero amperes, measuring red, green, and blue beam currents for each of said red, green, and blue pixel values, and storing said red, green, and blue pixel values and beam current values in said lookup table.

30. A computer-readable medium for storing instructions for causing a computer to perform the steps of:

determining average red, green and blue pixel values of a measurement area of a monitor identified by a user;

determining beam currents associated with said average red, green and blue pixel values;

loading phosphor characteristics of said monitor into computer memory;

calculating color output of said measurement area by using said phosphor characteristics of said monitor and said beam currents associated with said average red, green, and blue pixel values; and generating a lookup table containing at least one pixel value entry and a beam current entry for every pixel value entry, including at least the steps of calibrating said monitor so that a pixel value of zero results in a beam current measurement of zero amperes, generating a flat white field on said monitor, measuring a first set of red, green and blue pixel values, measuring a first set of beam currents associated with said first set of red, green, and blue pixel values, generating a gray field on said monitor, measuring a second set of red, green and blue pixel values, measuring a second set of beam currents associated with said second set of red, green, and blue pixel values, determining a relationship between pixel values and beam currents using said first and second sets of beam currents and said first and second sets of red, green, and blue pixel values, and generating said lookup table for red, green, and blue pixel values based on said relationship.

31. A computer-readable medium storing instructions for causing a computer to perform the steps of:

determining beam currents associated with red, green and blue pixel values in a measurement area that is smaller than a display area on a monitor identified by a user;

determining average red, green and blue pixel values of said measurement area of said monitor;

loading an array of phosphor characteristics of said monitor into computer memory; and calculating color output of said red, green, and blue pixel values in said measurement area by using said phosphor characteristics of said monitor and said beam currents associated with said red, green, and blue pixel values.

32. A computer-readable medium storing instructions for causing a computer to perform the steps of:

determining beam currents associated with red, green and blue pixel values in a measurement area on a monitor identified by a user;

loading an array of phosphor characteristics of said monitor into computer memory;

calculating color output of said red, green, and blue pixel values in said measurement area by using said phosphor characteristics; and said beam currents; and searching a database to match a color output and displaying a set of three matches that are closest.

33. A computer-readable medium storing instructions for causing a computer to perform the steps of:

determining beam currents associated with red, green and blue pixel values in a measurement area on a monitor identified by a user;

loading an array of phosphor characteristics of said monitor into computer memory;

calculating color output of said red, green, and blue pixel values in said measurement area by using said phosphor characteristics of said monitor and said beam currents associated with said red, green, and blue pixel values; and determining a relationship between pixel values and beam currents using first and second sets of beam currants and first and second sets of red, green and blue pixel values.

34. A computer-readable medium storing instructions for causing a computer to perform the steps of:

determining beam currents associated with red, green and blue pixel values in a measurement area on a monitor identified by a user;

loading an array of phosphor characteristics of said monitor into computer memory; and calculating color output of said red, green, and blue pixel values in said measurement area by using said phosphor characteristics of said monitor and said beam currents associated with said red, green, and blue pixel values;

wherein when implementing the instructions a monitor calibration related to a pixel value of zero results in a beam current of zero.

35. The computer-readable memory of claim 31 wherein the loading step loads phosphor characteristics stored on a computer readable memory during a prior calibration.

36. The computer-readable memory of claim 31 wherein the loading step loads phosphor characteristics stored on a read only computer readable memory.

* * * * *